United States Patent
Bollond et al.

(10) Patent No.: US 7,724,423 B2
(45) Date of Patent: May 25, 2010

(54) OPTICAL FIBER LASER HAVING IMPROVED EFFICIENCY

(75) Inventors: Paul Garry Bollond, Hamilton, NJ (US); Paul F. Wysocki, Flemington, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/377,089

(22) Filed: Mar. 16, 2006

(65) Prior Publication Data

US 2007/0216995 A1 Sep. 20, 2007

(51) Int. Cl.
*H04B 10/17* (2006.01)
*H04B 10/12* (2006.01)

(52) U.S. Cl. .................. 359/341.3; 359/341.5; 372/6

(58) Field of Classification Search ............ 359/341.32, 359/341.42, 341.3, 341.5; 372/6
See application file for complete search history.

(56) References Cited

U.S. PATENT DOCUMENTS

| | | | |
|---|---|---|---|
| 5,633,964 A | 5/1997 | DiGiovanni | |
| 5,731,892 A | 3/1998 | DiGiovanni | |
| 5,818,630 A * | 10/1998 | Fermann et al. | 359/341.31 |
| 5,867,305 A * | 2/1999 | Waarts et al. | 359/337.12 |
| 5,920,424 A | 7/1999 | Espindola | |
| 6,049,414 A | 4/2000 | Espindola | |
| 6,049,418 A | 4/2000 | Srivastava | |
| 6,104,733 A | 8/2000 | Espindola | |
| 6,141,142 A | 10/2000 | Espindola | |
| 6,195,200 B1 | 2/2001 | DeMarco | |
| 6,490,081 B1 * | 12/2002 | Feillens et al. | 359/343 |
| 6,611,372 B1 | 8/2003 | Peyghambarian | |
| 6,882,664 B2 | 4/2005 | Bolshtyansky | |
| 2005/0024716 A1 * | 2/2005 | Nilsson et al. | 359/341.31 |
| 2005/0105865 A1 * | 5/2005 | Fermann et al. | 385/122 |
| 2006/0044657 A1 * | 3/2006 | Gottwald | 359/896 |
| 2006/0251367 A1 * | 11/2006 | Seifert et al. | 385/123 |

OTHER PUBLICATIONS

Jeong et al. Seeded erbium/ytterbium codoped fibre amplifier source with 87 W of single-frequency output power. Electronics Letters. Nov. 27, 2003. vol. 39. No. 24.*
Hofer et al. High-Power Side-Pumped Passively Mode-Locked Er-Yb Fiber Laser. IEEE Photonics Technology Letters. vol. 10. No. 9. Sep. 1998.*
Shirakawa et al. Large-mode-are erbium-ytterbium-doped photonic-crystal fiber amplifier for high-energy femtosecond pulses at 1.55 microns. Optics Express. Feb. 21, 2005. vol. 13. No. 4.*

* cited by examiner

*Primary Examiner*—Eric Bolda
(74) *Attorney, Agent, or Firm*—Fletcher Yoder

(57) ABSTRACT

A method and apparatus for improved efficiency in optical fiber lasers. The system increases the efficiency of cladding pumped optical fiber amplifiers through a seeding technique which includes pumping an erbium/ytterbium doped fiber amplifier with pump energy, directing an optical signal through the erbium/ytterbium doped fiber amplifier, and seeding the optical signal with seed energy. The seed energy may have a higher energy level than the optical signal and a lower energy level than the pump energy, and the seed energy may be initially amplified in the amplifier and subsequently attenuated while amplifying the optical signal in the amplifier.

22 Claims, 6 Drawing Sheets

OPTICAL FIBER LASER HAVING IMPROVED EFFICIENCY

STATEMENT OF GOVERNMENT FUNDED RESEARCH

The U.S. Government has a paid-up license in this invention and the right in limited circumstances to require the patent owner to license others on reasonable terms as provided for by the terms of Grant No. NRO 000-04-C-0226 awarded by the National Aeronautics and Space Administration.

BACKGROUND

1. Technical Field

The present invention relates generally to optical amplifying systems. More specifically, the invention relates to optical amplifying systems for high power optical fiber lasers.

2. Description of the Related Art

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since its introduction in the 1980's, the use of optical fiber in the communications industry has been increasing. Providing a significantly higher bandwidth than its copper wire counterpart, as well as lower losses and less susceptibility to crosstalk, more phone calls are able to be handled and the calls are clearer, especially when over long distances. Today, optical fiber is strung around the globe and serves as a backbone for communications systems such as ground-line telephones, cell phones, cable TV, and networks, including the Internet.

In the 1990's the development of the erbium-doped fiber amplifier (EDFA) further increased the efficiency of the fiber optic communications. The EDFA is an optical amplifier made of a glass fiber doped with the rare earth metal erbium. An optical signal may need to be amplified for a variety of reasons. For example, in long runs of fiber, amplification preserves a signal that has been attenuated through losses occurring along the length of the fiber. Additionally, amplification may be used to enable the signal to operate at higher power levels for high power applications, such as laser printing and etching.

Before the development of the EDFA, amplification of an optical signal involved detecting the optical signal, translating it into an electrical signal, and then amplifying the electrical signal. The amplified electrical signal was then converted back into an optical signal for transmission. While there are still opto-electrical amplifiers in use today, optical amplifiers, such as the EDFA are much more prevalent. Optical amplifiers make use of the physical properties of rare-earth metals such as neodymium, erbium, and ytterbium, for example. These rare-earth metals may be used alone or in combination, such as in an erbium/ytterbium amplifier, and are doped into an optical fiber which serves as both the signal path and the gain medium. Optical energy having wavelengths near 970 nm or 1480 nm from a pump source is absorbed by the rare-earth metal ions and places the ions in a higher energy state. The energized rare-earth metals subsequently transfer energy to a signal traveling through the doped fiber.

Today, optical amplification may be used to enable a signal to operate at much higher power levels than conventional communication systems. Typically, Earth-bound communication systems, like the ground-line telephone or Internet, operate at about 0.2 watts, however, higher power systems may require that the amplifier be able to operate at 10 watts average power and 700 watts peak power, for example. The higher power levels have applications in a variety of fields including: communications between satellites, deep space communications, LIDAR sensing systems, detection systems, laser printing, machining, and etching.

When using an optical amplifier, three optical properties of transition are occurring, namely: 1) spontaneous emission of a photon, 2) stimulated emission of a photon, and 3) absorption. The stimulated emission of photons is the basis for amplification in laser system, but competes with the other two transitions. Ideally, all of the optical power from the pump transfers to the signal through the stimulated emission of photons at the signal wavelength. Throughout the amplification process, however, power may be lost through lasing and spontaneous emission of photons. Lasing and spontaneous emissions are more likely to occur when there is an inversion spike, or stated differently, when a large number of ions suddenly absorb energy and electrons move into higher energy levels. Such an inversion occurs at the front end of erbium/ytterbium amplifiers as pump energy is absorbed by the erbium and ytterbium ions.

In an erbium/ytterbium amplifier, a pump source between approximately 910-990 nm provides optical energy to erbium and ytterbium ions. The ytterbium absorbs the pump energy at a higher rate and a wider wavelength range than the erbium and moves into a higher energy state quickly. The ytterbium in turn transfers energy to the erbium ions. Thus, the ytterbium serves as a catalyst to raise the energy level of the erbium ions quickly. The erbium ions then transfer energy to the signal, thus amplifying the signal. As the signal travels the length of the erbium/ytterbium amplifier, its strength increases as it absorbs more and more of the energy that originated from the pump source.

As described previously, the ytterbium ions absorb pump energy more quickly than the erbium ions. Additionally, at higher power levels energy is transferred from the ytterbium ions to the erbium ions less effectively than at lower power levels causing a buildup of energy in the ytterbium ions and an inversion spike. Therefore, the potential lasing of ytterbium is increased due to the inversion spike at the front end of an amplifier. In particular, the lasing of ytterbium at approximately 1060 nm is a particular risk, and should be precluded. At the elevated power levels, such as above seven watts, parasitic lasing and spontaneous emissions not only reduce the efficiency of the system, but can also lead to hardware damage. Therefore, a system is needed to reduce the front end inversion spike and, thereby, eliminate parasitic lasing and increase the efficiency of the amplifier.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is disclosed a system and method of operating a high power optical amplifier comprising pumping an erbium/ytterbium doped fiber amplifier with optical energy, directing a signal through the erbium/ytterbium doped fiber amplifier, and seeding the signal with optical energy prior to directing the signal through the erbium/ytterbium doped fiber amplifier.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming but would nevertheless be a routine undertaking of design, fabrication, and manufacture for those of ordinary skill having the benefit of this disclosure.

Figure 1:
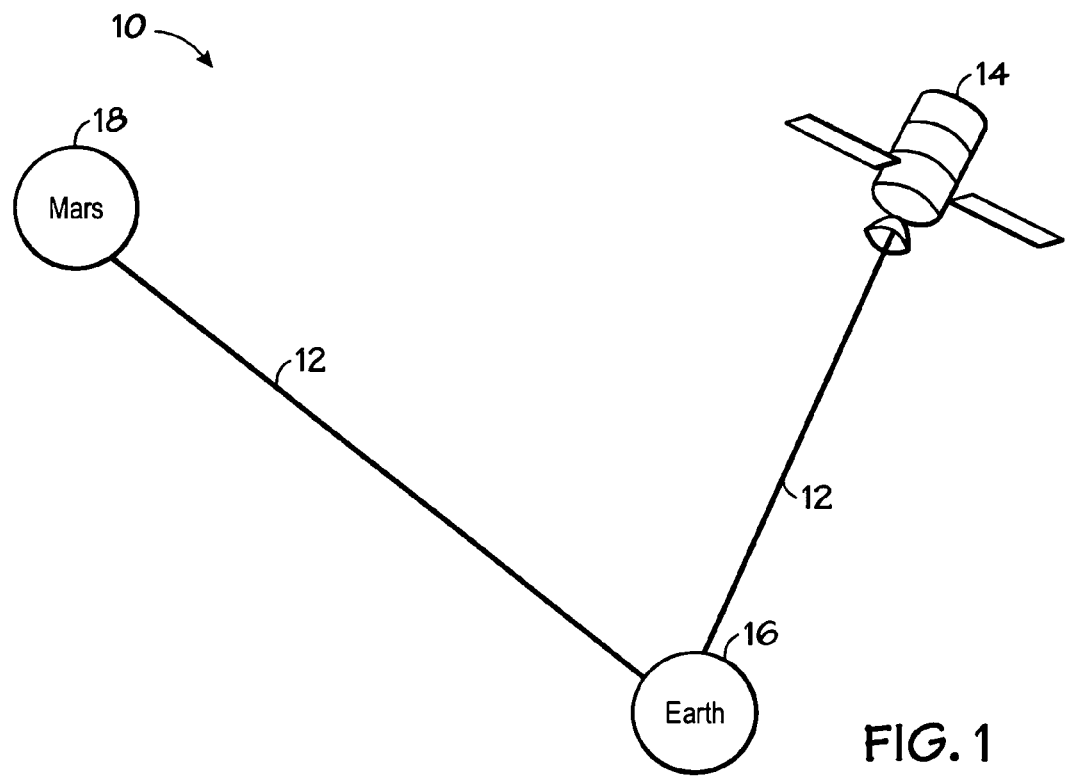
FIG. 1 illustrates communication system applications in accordance with an exemplary embodiment of the present invention.

As will be discussed in greater detail below, the seeding of a cladding pumped erbium/ytterbium optical amplifier reduces front end inversion and helps preclude unwanted lasing and spontaneous emission. FIG. 1 shows an illustrative application in accordance with an exemplary embodiment of the present invention and is generally designated by the reference numeral 10. Specifically, a high power laser signal 12 is transmitted through the atmosphere to communicate between a satellite 14 and the Earth 16. Cladding pumped optical amplifier lasers are located on the satellite and on Earth to provide two-way communications. The laser signal 12 may also be used in deep space communications, such as to communicate between the Earth 16 and Mars 18, in which case a laser would be placed on Mars 18 as well.

Figure 2:
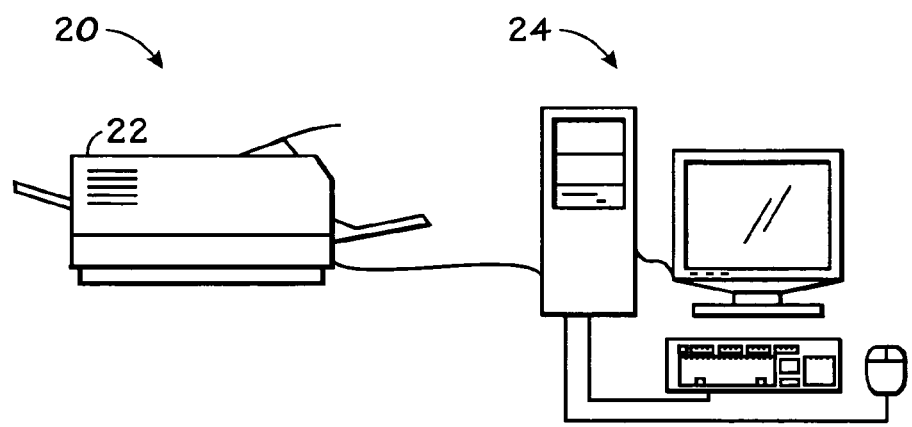
FIG. 2 illustrates an alternative application in accordance with another exemplary embodiment of the present invention.

An alternative application is illustrated in FIG. 2 in accordance with an exemplary embodiment of the present invention and is generally designated by reference numeral 20. Specifically, a typical computer system 20 is shown having a laser printer 22 coupled to a computer 24. The presently disclosed embodiments allow for operating at higher power levels to provide greater resolution and efficiency for laser printer systems. Efficiency is increased by reducing unwanted lasing and spontaneous emissions and greater resolution is attained by providing better power. Other applications which are not shown may include: other communication systems, such as cable TV; laser detection and sensing systems, such as LIDAR; and machining and etching applications. It should be understood, however, with so many different applications, each application may have different configurations according to needs specific to that application, but would still be in harmony with the principles of this disclosure.

Figure 3:
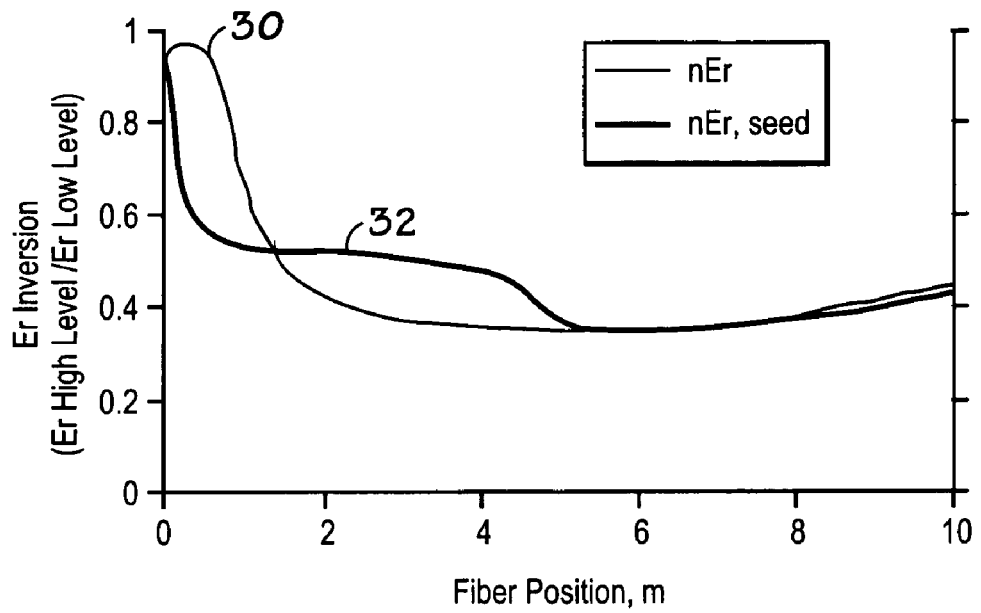
FIG. 3 illustrates an erbium inversion profile with and without a seed in accordance with an exemplary embodiment of the present invention.

An inversion profile shows the ratio of ions in an elevated state to ions in a lower state relative to position in the length of a fiber. FIG. 3 illustrates an erbium inversion profile in accordance with embodiments of the present invention. Specifically, it shows two plots of an erbium inversion relative to the fiber position, the fiber position, in meters, being plotted on the x-axis and the erbium inversion (erbium ions in higher energy state/erbium ions in lower energy state) being plotted on the y-axis. As can be seen, without a 1535 nm seed the erbium is close to being fully inverted within the first two meters of fiber as indicated by the plot 30. The inversion spike at the beginning of the fiber, as shown by the plot 30, causes problems such as reflectance and lasing as the fiber acts as a weak scattering mirror. Furthermore, with a large number of the erbium ions in the elevated state there is little absorption of energy from the ytterbium ions by the erbium ions. Thus, the ytterbium ions are at risk of lasing and spontaneous emissions.

The addition of a seed, as indicated by the plot 32, significantly reduces erbium inversion in the first few meters of the amplifier. Erbium inversion is spread out more evenly throughout the full length of the fiber. Ideally, the inversion profile would be a horizontal line indicating a constant inversion rate in the amplifier and having gain uniform throughout the fiber. With the seed, the front end inversion is dramatically reduced, the profile is substantially more flat and the gain more uniform throughout the length of the fiber. Thus, there is a redistribution of amplification throughout the length of the fiber and the seed effectively controls whether lasing occurs.

Figure 4:
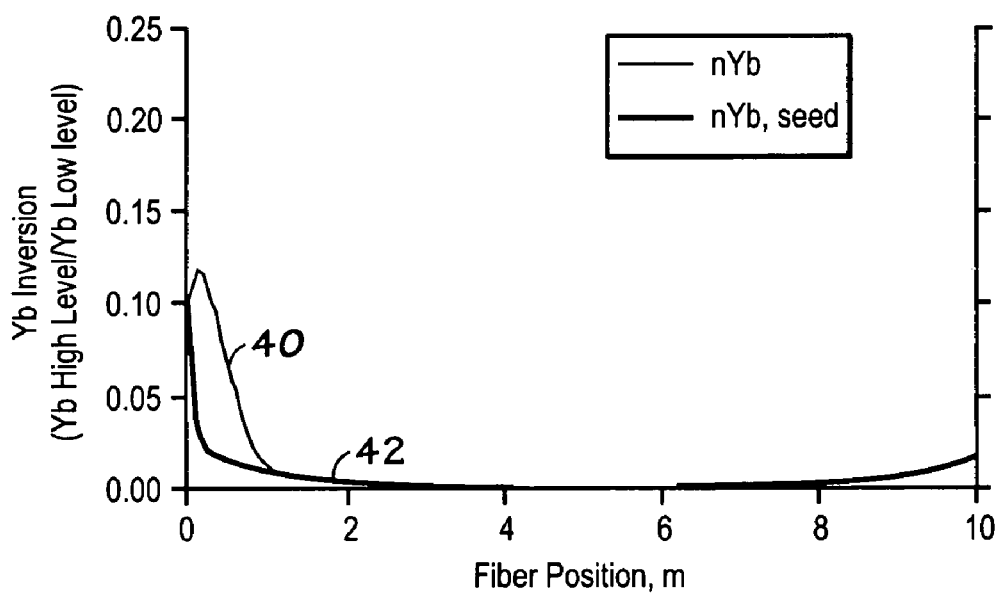
FIG. 4 illustrates an ytterbium inversion profile with and without a seed in accordance with an exemplary embodiment of the present invention.

In addition to the erbium ion inversion spike, there is an inversion of the ytterbium ions. FIG. 4 shows an ytterbium inversion profile in accordance with an exemplary embodiment of the present invention. Within the first two meters of the optical amplifier, the ytterbium ions experience an inversion spike, as indicated by the plot 40. The inversion spike in the ytterbium ions coinciding with the inversion spike in the erbium ions, reduces the ability of the ytterbium ions to effectively transfer their absorbed optical energy and, consequently places the ytterbium ions at risk for spontaneous emissions and parasitic lasing, as described above. As with the erbium ions, however, the addition of a 1535 nm seed spreads the ytterbium inversion out over the length of the fiber, while reducing the front end inversion spike. This advantageously prevents parasitic lasing and reflectance within the first few meters.

While the plots of FIG. 3 and FIG. 4 are representative of seeding with a 1535 nm seed, similar plots showing the reduction of inversion in the first few meters of the fiber may be achieved through seeds at different wavelengths, such as at 1032 nm. The specific designs of a particular application may warrant the use of various other wavelengths as seeds. A seed at 1032 nm would primarily be active in ytterbium and a 1535 nm seed would be active in erbium in either an erbium only amplifier or in an erbium/ytterbium amplifier. The effectiveness of a seed at a particular wavelength on a particular ion depends on the ion's ability to absorb the wavelength and, as a consequence, move to a higher energy state. Due to the conservation of energy, a lower energy seed, one having a longer wavelength, cannot transfer energy to a higher energy signal. Therefore, the selected seed wavelengths have shorter wavelengths than that of the signal to ultimately amplified, in this case 1550 nm. Additionally, the seeds have longer wavelengths than the pump, in this case 970 nm, based on the same principle.

Figure 5:
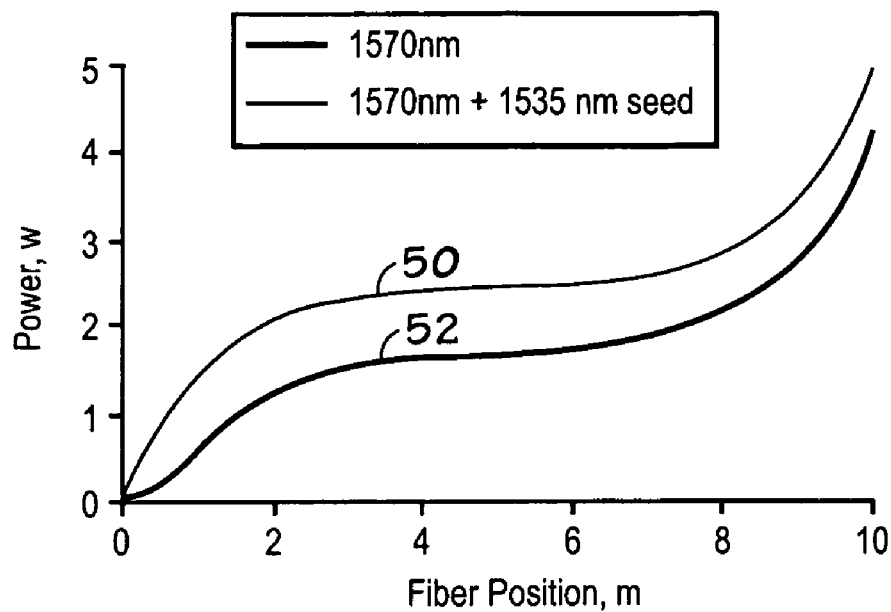
FIG. 5 illustrates signal output with and without a seed in accordance with an exemplary embodiment of the present invention.

As described earlier, the use of seeds in an optical amplifier system increases the efficiency of the system as well as the power output. FIG. 5 illustrates the output power of a signal, such as a pulsed communication signal, in an optical amplifier with and without a seed in accordance with an exemplary embodiment of the present invention. The signal at 1570 nm without a seed is illustrated by the plot 52. As can be seen by the plot 50, the addition of a 1535 nm seed has significantly increased the power of the amplified signal, as compared to a signal without a seed. The increased power is present throughout the length of the amplifier as well as on the output. The seed was operating at a very low power level, only 10-20 mW, but the output indicates a gain of greater than approximately 500 mW was achieved through the use of the seed. Thus, the addition of the seed allows for producing a higher signal power output and increased the efficiency of the system.

Figure 6:
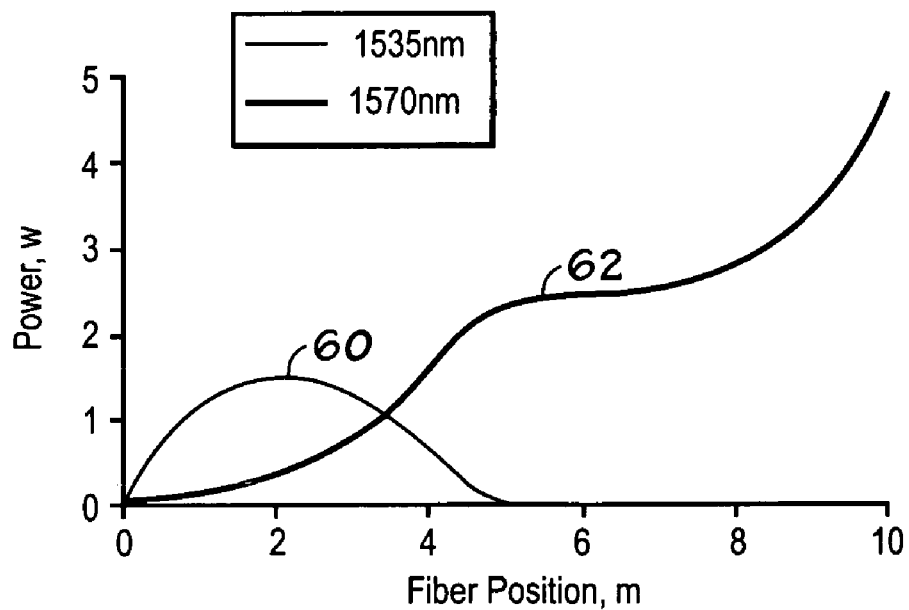
FIG. 6 illustrates power transfer to a signal in accordance with an exemplary embodiment of the present invention.

The efficiency gained by using the seed is further illustrated in FIG. 6, which shows the transfer of power from the seed to signal. Plot 60 illustrates the seed power and indicates a sharp increase in at the front end of the fiber followed by decline after about two meters. Contrastingly, plot 62 illustrates the signal power and indicates a slower increase at the front end of the fiber, but increasing more rapidly after about two meters. The increase in power of the signal is coincident with the decrease in power of the seed, as can be seen from the two meter mark to the four meter mark. After the seed is used up, the slope of signal power levels out before increasing again after about seven meters. Therefore, it can be safely surmised that the power of the seed is transferred to the signal during the first few meters of fiber.

Figure 7:
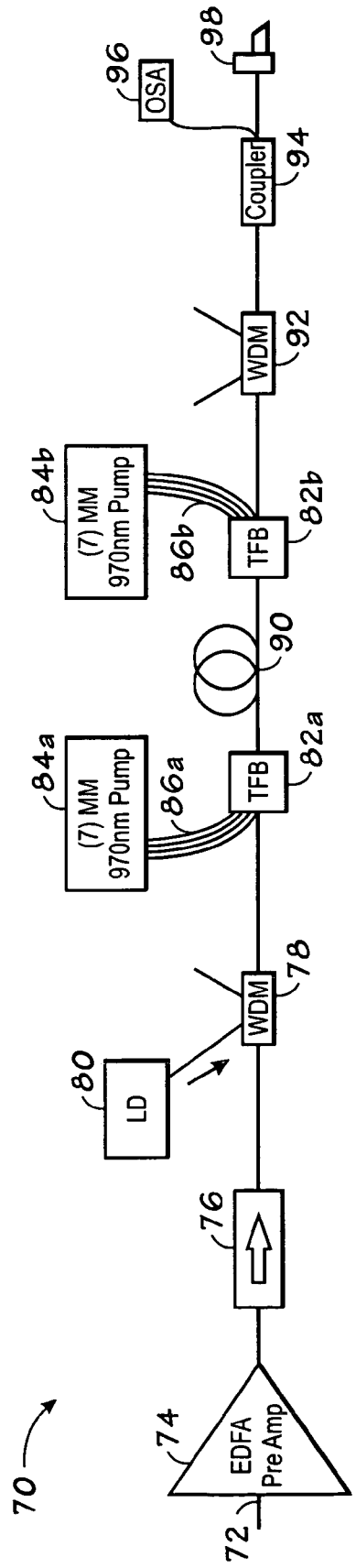
FIG. 7 illustrates an optical amplifier having seed injection in accordance with an exemplary embodiment of the present invention.

Turning to FIG. 7, an exemplary optical amplifier system is illustrated in accordance with an exemplary embodiment of the present invention and is generally designated by reference numeral 70. An erbium doped fiber amplifier ("EDFA") 74 may be placed at the beginning of the signal path 72 to boost the initial signal prior to having it enter the optical amplifier 90. An optical isolator 76 may be used to eliminate reflectance of the signal backwards along the signal path as well as other unwanted modes. A laser diode 80 operating as a seed is coupled into the signal path using a wavelength division multiplexer ("WDM") 78. The laser diode may be operating at either 1032 nm, 1535 nm, or any other appropriate wavelength, as discussed above. In response to feedback from the output of the optical amplifier, the laser diode 80 may be configured to adjust its output in order to achieve maximum efficiency. Furthermore, the laser diode 80 may be configured to automatically turn on when a signal is present and turn off in the absence of a signal. Alternatively, the laser diode 80 may be configured to be manually adjusted. The WDM 78 may comprise a 1060/1550 WDM for operation with a 1032 nm the seed or a 1530/1555 WDM for operation with a 1535 nm seed.

The tapered fiber bundles 82a-b anchor each end of the optical amplifier fiber 90 and are made up of six fibers organized in a circular pattern around a central signal carrying fiber for a total of seven fibers. The tapered fiber bundle may have any number of fibers arranged in any manner, however, typically the tapered fiber bundles are manufactured with either seven or nineteen total fibers. In any arrangement, however, the center fiber remains the signal carrying fiber. The center fiber is a single mode fiber, whereas all of the other fibers in the tapered fiber bundle 82 are multi-mode fibers. The use of multi-mode fibers allows for a greater amount of optical power to be coupled through the cladding into the signal path. The single mode signal carrying fiber, central to the tapered fiber bundle, is coupled to an erbium/ytterbium optical amplifier 90.

The tapered fiber bundles 82a-b are pumped via the multimode fibers 86a-b. The multimode fibers 86a-b are coupled to light sources 84a-b, such as laser diode arrays that provide pump at 970 nm. The light sources 84a-b are individually controlled, thereby allowing for a different level of power to be pumped into the first tapered fiber bundle 82a than the second tapered fiber bundle 82b. For example, the first light source 84a may operate at 23 W, while the second light source may operate at 21 W.

The optical amplifier 90 may is cladding pumped by the tapered fiber bundles 82a-b. Alternatively, filter type devices may also be used to pump the optical amplifier. The optical amplifier 90 is a silica fiber doped with erbium and ytterbium ions. The erbium and ytterbium ions are placed in an elevated energy state through cladding pumping and subsequently transfer energy into the signal. As a signal passes through the length of the fiber, the signal is amplified. The optical amplifier 90 may have a length of seven meters, selected for optimal gain with available pump power and erbium and ytterbium ion concentrations in the fiber.

A WDM 92 positioned at the exit of the amplifier removes any excess seed remaining in the signal path. This provides a cleaner signal, and also helps ensures that any reflected signal back to the amplifier is attenuated. A coupler 94 may be used for monitoring by attaching an optical spectrum analyzer 96. The coupler 94 may also be used to divide the output signal into multiple signals, for example if the optical amplifier is being used in a cable TV system, the coupler could divide the signal for use by multiple customers. The amplified signal exits the system at the output 98 and may be used according to the many applications described earlier.

Figure 8:
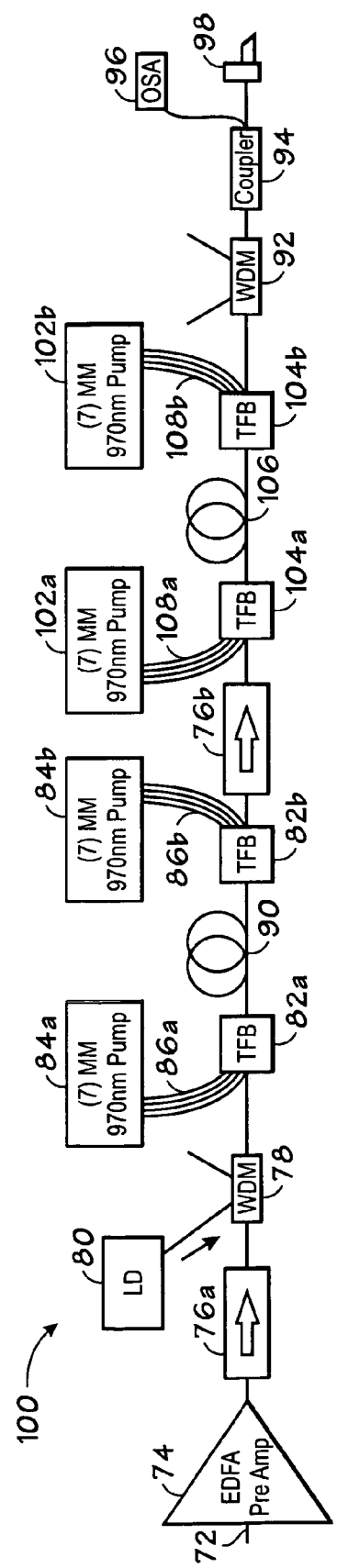
FIG. 8 illustrates the cascading of optical amplifiers in accordance with an exemplary embodiment of the present invention.

An alternative embodiment is illustrated in FIG. 8, wherein a signal path having cascaded optical amplifiers is shown in accordance with an exemplary embodiment of the present invention and is generally designated with the reference numeral 100. The use of cascaded optical amplifiers allows for the use of smaller gain entities. An isolator 76b is placed in between the two optical amplifiers 90 and 106 to separate the gain of the two stages from the amplified spontaneous emissions which propagate in forward and backward directions. This also lowers the amount of reflectance that occurs. All optical amplifiers operate within certain parameters such as the amount of optical energy input and the amount output. There are limits in the amount of power that can be used to pump an optical amplifier, and the use of two stages helps to facilitate the achieving a particular output level.

The optical amplifiers are serially located along the signal path to increase signal power. The second optical amplifier 106 may be identical to the first optical amplifier 90 in that it is cladding pumped with tapered fiber bundles 104a-b on each end supplying 970 nanometer pump through six multi-mode fibers. Further the optical amplifier fiber 106 may comprise erbium and ytterbium doped silica.

Figure 9:
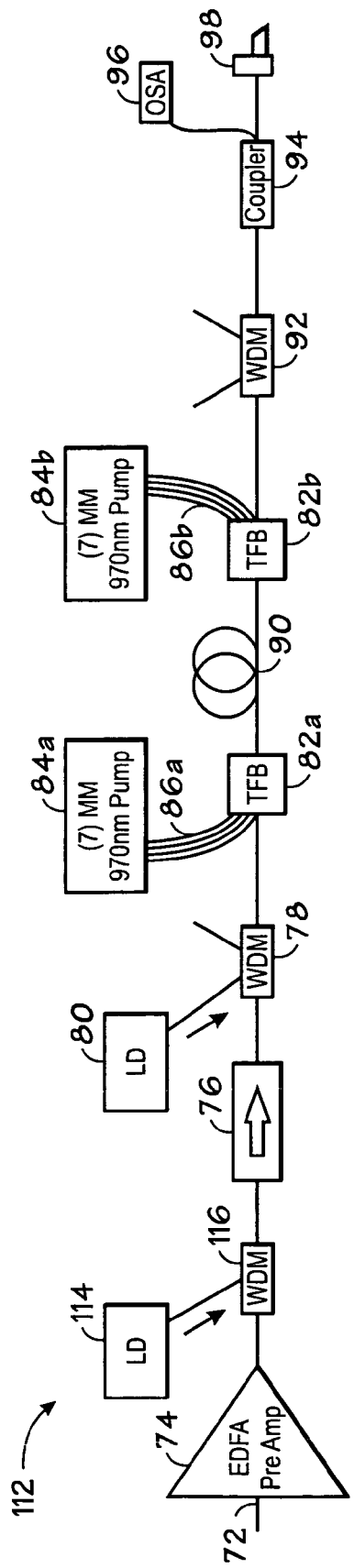
FIG. 9 illustrates an optical amplifying system wherein multiple seeds are used in accordance with an exemplary embodiment of the present invention.

In addition to having cascaded optical amplifiers, multiple seeds may be used. FIG. 9 illustrates an exemplary optical amplifier system having multiple seeds in accordance with embodiments of the present invention and is generally designated by the reference numeral 112. Multiple seeds may be used in order to more effectively seed the optical amplifier as different wavelengths may be more effective for the seeding of certain ions. For example, a 1032 nm seed is effective for ytterbium ions and not for erbium ions. The effectiveness of the seed for a particular ion depends entirely on whether or not the ions absorb optical energy at that frequency. Furthermore, the wavelengths selected may depend on the particular application for which the laser is to be used.

As shown, the system 72 includes two laser diodes, one operating at 1535 nm and the other at 1032 nm. The laser diode 80 injects a seed having a wavelength of 1032 nm, through a 1060/1555 WDM 78, while the laser diode 114 injects a 1535 nm wavelength seed into the signal path through a 1530/1555 WDM 116. As discussed earlier, the utilization of seeds helps to increase the effectiveness of the pump in the amplifier 90 by reducing front end inversion in both the erbium and the ytterbium. In addition to reducing parasitic effects, the efficiency of the system is increased While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus comprising:
    a cladding pumped erbium/ytterbium amplifier coupled into a transmission path of an optical signal, wherein pump energy is provided to a cladding of the erbium/ytterbium amplifier and the pump energy amplifies the optical signal along the length of the amplifier;
    a coupling device coupled into the transmission path of the optical signal; and
    a seed laser coupled to the coupling device, the seed laser configured to inject a specified seed energy into the amplifier, wherein the seed energy is selected such that in operation, it will be initially amplified in the amplifier and subsequently absorbed in the amplifier while amplifying the optical signal in the amplifier, and wherein the seed energy comprises a longer wavelength than the pump energy and a shorter wavelength than the optical signal.

2. The apparatus of claim 1, wherein the erbium/ytterbium amplifier comprises:
    a fiber optic bundle coupled to the erbium/ytterbium amplifier; and
    a source of pump energy coupled to the fiber optic bundle and configured to provide the pump energy into a cladding of the cladding pumped erbium/ytterbium amplifier.

3. The apparatus of claim 1, wherein the seed laser operates at approximately 1032 nm.

4. The apparatus of claim 1, wherein the seed laser operates at approximately 1535 nm.

5. The apparatus of claim 1, wherein the seed laser operates at approximately 1032 nm and a second seed laser operates at approximately 1530 nm.

6. The apparatus of claim 1 comprising a second cladding pumped erbium/ytterbium amplifier coupled into the transmission path.

7. The apparatus of claim 6, wherein an optical isolator is coupled to the transmission path between the first cladding pumped erbium/ytterbium amplifier and the second cladding pumped erbium/ytterbium amplifier.

8. The apparatus of claim 1, wherein the seed laser is coupled into the transmission path by a wavelength division multiplexer.

9. The apparatus of claim 8, wherein the seed laser operates at approximately 1032 nm and is coupled to the transmission path by a 1060/1550 nm wavelength division multiplexer.

10. The apparatus of claim 8, wherein the seed laser operates at approximately 1535 nm and is coupled to the transmission path by a 1535/1550 nm wavelength division multiplexer.

11. The apparatus of claim 1, wherein the erbium/ytterbium amplifier comprises:
    a filter coupled to the cladding pumped erbium/ytterbium amplifier; and
    a source of pump energy configured to provide pump energy into a cladding of the cladding pumped erbium/ytterbium amplifier.

12. A method of operating a high power optical amplifier comprising:
    pumping an erbium/ytterbium doped fiber amplifier with pump energy;
    directing an optical signal through the erbium/ytterbium doped fiber amplifier; and
    seeding the optical signal with seed energy prior to directing the optical signal through the erbium/ytterbium doped fiber amplifier, wherein the seed energy has a higher energy level than the optical signal and a lower energy level than the pump energy, wherein the seed energy is selected such that it can be initially amplified in the amplifier and subsequently attenuated while amplifying the optical signal in the amplifier.

13. The method of claim 12, wherein pumping an erbium/ytterbium doped fiber amplifier with pump energy comprises coupling optical energy having a wavelength of approximately 910-990 nm into the cladding of the erbium/ytterbium doped fiber amplifier.

14. The method of claim 12, comprising seeding the optical signal with seed energy having a wavelength of approximately 1535 nm prior to directing the signal through the erbium/ytterbium doped fiber amplifier.

15. The method of claim 12, wherein seeding the optical signal with seed energy comprises coupling optical energy having a wavelength of approximately 1032 nm into the signal.

16. The method of claim 12, wherein seeding the optical signal with seed energy comprises coupling optical energy having a wavelength of approximately 1535 nm into the signal.

17. The method of claim 12, wherein seeding the optical signal with seed energy comprises coupling optical energy having wavelengths of approximately 1032 nm and 1535 nm into the signal.

18. The method of claim 12, comprising directing the optical signal into a second erbium/ytterbium doped fiber amplifier.

19. The method of claim 18, comprising using an optical isolator to isolate an amplified signal between the amplifiers.

20. The method of claim 12, wherein pumping the amplifier comprises coupling pump energy having a wavelength of approximately 970 nm into the cladding of signal carrying fiber.

21. The method of claim 20, wherein the coupling pump energy into the cladding is accomplished by using a tapered fiber bundle.

22. The method of claim 18 wherein the coupling of pump energy into the cladding is accomplished by using a filter device.

* * * * *